United States Patent Office 3,810,926
Patented May 14, 1974

3,810,926
**21-DIALKYLAMINO-20-METHYLPREGNA-4,17(20)-
DIEN-3-ONES AND CONGENERS**
George R. Lenz, Glenview, Ill., assignor to
G. D. Searle & Co., Chicago, Ill.
No Drawing. Filed July 30, 1973, Ser. No. 383,527
Int. Cl. C07c 169/36
U.S. Cl. 260—397.1         9 Claims

ABSTRACT OF THE DISCLOSURE

Preparation of 21-dialkylamino-20-methylpregna-4,17 (20)-dien-3-ones and congeners, and the valuable antibiotic and antiulcerogenic properties of said amines are disclosed.

---

This invention relates to 21-dialkylamino-20-methylpregna-4,17(20)-dien-3-ones and congeners, and to processes for the preparation thereof. More particularly, this invention provides amines of the formula

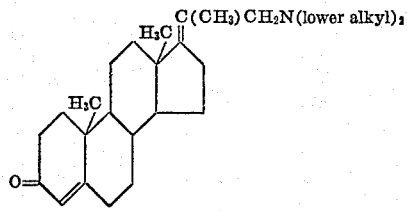

and amides of the formula

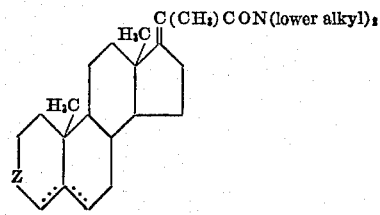

wherein Z represents β-(lower alkanoyloxy)methylene, β-hydroxymethylene, or carbonyl, and the dotted line denotes Δ⁴ unsaturation when Z represents carbonyl and Δ⁵ unsaturation otherwise.

Equivalent to the enformulated amines, for the purposes of this invention, are corresponding acid addition salts having the formula

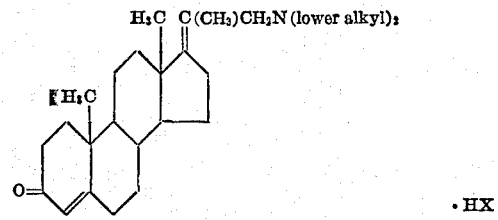

wherein X represents 1 equivalent of an anion—for example, chloride, bromide, iodide, nitrate, phosphate, sulfate, sulfamate, methyl sulfate, ethyl sulfate, benzene-sulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither biologically nor otherwise undesirable.

By "lower alkyl" is meant methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain hydrocarbon groupings of the formula $$-C_nH_{2n+1}$$

wherein $n$ represents a positive integer less than 8. "Lower alkanoyloxy" as used herein designates a radical of the formula

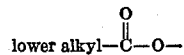

The amines to which this invention relates are useful by reason of their valuable biological properties, and the amides of the invention are useful as intermediates thereto. Among the aforesaid biological properties, antibiotic activity predominates. This activity includes the capacity to inhibit the growth of bacteria such as *Bacillus subtilis, Escherichia coli, Salmonella paratyphi A,* and *Erwinia* sp.; protozoa such as *Trichomonas vaginalis;* helminths such as *Turbatrix aceti;* fungi such as *Trichophyton mentagrophytes, Candida albicans, Fusarium* sp., and *Verticellium albo-atrum;* and and algae such as *Chlorella vulgaris.* The amines are also antiulcerogenic.

Standardized tests for the foregoing antibiotic activities are described in U.S. 3,679,697 and U.S. 3,682,951. 21-Diethylamino-20-methylpregna-4,17(20)-dien-3-one, the product of Example 9 hereinafter, was found active in these tests at 100 mcgm. per ml. against *B. subtillis, Erwinia* sp., *T. mentagrophytes, V. albo-atrum,* and *C. vulgaris,* and at 1000 mcgm. per ml. against *E. coli, S. paratyphi A, T. vaginalis, T. aceti, C. albicans,* and *Fusarium* sp. It was also active at 5 mg. when administered intragastrically in the standardized test for antiulcerogenic activity described in U.S. 3,483,192.

Those skilled in the art will recognize that observations of activity in standardized tests for particular biological effects are fundamental to the development of valuable new drugs, both veterinary and human.

The compounds of this invention can be prepared as follows:

A 3β-(lower alkanoyloxy)androst-5-en-17-one is contacted with an N,N-di(lower alkyl)-1-propynylamine in the presence of boron trifluoride etherate and dioxane, affording a 3β-(lower alkanoyloxy)-N,N-di(lower alkyl) pregna - 5,17(20)-diene-20-carboxamide. [The configuration deriving from the exocyclic double bond in this and other products of the invention is acritical: both *cis* and *trans* isomers will serve for the contemplated purposes.] The ester linkage is cleaved by contacting with aqueous methanolic potassium carbonate, and the resultant 3β-hydroxy-N,N-di(lower alkyl)-pregna-5,17(20)-diene-20-carboxamide is oxidized via the Oppenauer procedure to an N,N-di(lower alkyl)-3-oxopregna-4,17(20)-diene-20-carboxamide. The 3-keto group in the latter compound is protected by condensation with triethyl orthoformate in the presence of p-toluenesulfonic acid monohydrate, dioxane, and absolute ethanol; the resultant 3-ethoxy-N,N-di(lower alkyl)pregna-3,5,17(20)-triene-20-carboxamide is heated with lithium tetrahydroaluminate(1-) in tetrahydrofuran whereby the amidic oxygen is reduced; and the 21-di(lower alkyl)amino - 3-ethoxy-20-methylpregna-3,5,17(20)-triene thus obtained is converted to a 21-di(lower alkyl) amino - 20-methylpregna-4,17(20)-dien-3-one by heating with aqueous hydrochloric acid.

The basic amines of this invention are converted to the equivalent acid addition salts hereof by admixture with 1 equivalent of any of various inorganic and strong organic acids wherein the anion is defined by X above. The salts, in turn, are reconverted to the basic amines upon contacting with excess alkali.

The following examples described in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3$\beta$-acetoxy-N,N-dimethylpregna-5,17(20)-diene-20-carboxamide.

To a solution of 5 parts of 3$\beta$-acetoxy-androst-5-en-17-one and 5 parts of N,N-dimethyl-1-propynyl-amine in 50 parts of dioxane is added, with stirring, 1 part of boron trifluoride etherate. Heat is evolved, and the reaction mixture turns bright red. Solvent is removed by vacuum distillation, and the residue is taken up in benzene. The benzene solution is chromatographed on silica gel, using benzene and mixtures thereof with increasing amounts of ethyl acetate as developing solvents. From an eluate comprising 10% of ethyl acetate in benzene, on evaporation of solvent, (Z)-3$\beta$-acetoxy-N,N-dimethylpregna-5,17(20)-diene-20-carboxamide is obtained as the residue. A subsequent eluate comprising 15% of ethyl acetate in benzene affords, on evaporation of solvent, (E)-3-$\beta$-acetoxy-N,N-dimethylpregna - 5,17(20)-diene-20-carboxamide as the residue. The products have the formula

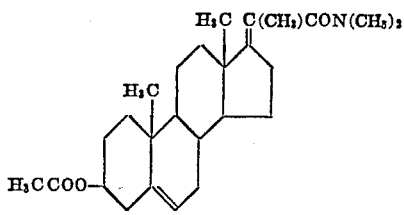

EXAMPLE 2

3$\beta$-hydroxy-N,N-dimethylpregna-5,17(20)-diene-20-carboxamide.

To a solution of 5 parts of 3$\beta$-acetoxy-N,N-dimethylpregna - 5,17(20)-diene-20-carboxamide in 100 parts of methanol is added, with stirring, 5 parts of potassium carbonate and 12 parts of water. The resultant suspension is stirred overnight, then partitioned between water and chloroform. The chloroform phase is dried over anhydrous sodium sulfate and then stripped of solvent by vacuum distillation. The residue is 3$\beta$-hydroxy-N,N-dimethylpregna-5,17(20)-diene-20-carboxamide.

EXAMPLE 3

N,N-dimethyl-3-oxopregna-4,17(20)-diene-20-carboxamide.

To a solution of 14 parts of 3$\beta$-hydroxy-N,N-dimethylpregna-5,17(20)-diene-20-carboxamide in a mixture of 150 parts of cyclohexanone and 800 parts of toluene at the boiling point under reflux is added, portionwise stirring during ¼ hour, a solution of 15 parts of aluminum isopropoxide in 150 parts of toluene. Heating of the boiling point under reflux with stirring is continued for 1¼ hours after the addition is complete, whereupon the reaction mixture is cooled slightly and then poured into a solution of 75 parts of Rochelle salt in 200 parts of water. The mixture thus obtained is steam distilled to remove solvent. The distilland is then cooled, whereupon N,N-dimethyl-3 - oxopregna-4,17(20)-diene-20-carboxamide precipitates therefrom. The product is isolated by filtration and dried in air.

EXAMPLE 4

20-methyl-21-dimethylaminopregna-4,17(20)-dien-3-one hydrochloride.

To a mixture of 20 parts of N,N-dimethyl-3-oxopregna-4,17(20)-diene-20-carboxamide, 30 parts of triethyl orthoformate, 60 parts of dioxane, and 40 parts of absolute ethanol at 0° is added, with stirring, 2 parts of $p$-toluenesulfonic acid monohydrate. The resultant mixture is stirred for 20 minutes, then poured into a solution of 20 parts of pyridine in 2000 parts of water. The mixture thus obtained is extracted with dichloromethane. The dichloromethane extract is dried over anhydrous sodium sulfate and thereupon stripped of solvent by vacuum distillation. The residue is dissolved in 1250 parts of tetrahydrofuran. To this solution is added 20 parts of lithium tetrahydroaluminate(1-). The resultant mixture is heated at the boiling point under reflux overnight, at which point 200 parts of ethyl acetate is introduced. The mixture thus obtained is poured into a solution of 500 parts of concentrated hydrochloric acid in 5000 parts of water, and the resultant mixture is stirred for ½ hour and then extracted with chloroform. The chloroform extract is dried over anhydrous sodium sulfate and then stripped of solvent by vacuum distillation. The residue is 20-methyl-21-dimethyl-aminopregna-4,17(20)-dien-3-one hydrochloride, having the formula

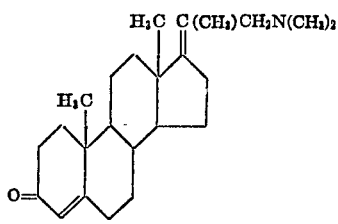

EXAMPLE 5

3$\beta$-acetoxy-N,N-diethylpregna-5,17(20)-diene-20-carboxamide.

Substitution of 5 parts of N,N-diethyl-1-propynylamine for the N,N-dimethyl-1-propynylamine called for in Example 1 affords, by the procedure there detailed, (Z)-3$\beta$-acetoxy - N,N - diethylpregna-5,17(20)-diene-20-carboxamide and (E)-3$\beta$-acetoxy-N,N-diethylpregna-5,17(20)-diene-20-carboxamide. The former, following isolation from an eluate comprising 10% ethyl acetate in benzene and recrystallization from petroleum ether, melts at 149–151°; the latter, isolated from an eluate comprising 15% ethyl acetate in benzene and recrystallized from a mixture of ether and petroleum ether, melts at 161–163°. Both products are colorless.

EXAMPLE 6

N,N-diethyl-3$\beta$-propionyloxypregna-5,17(20)-diene-20-carboxamide.

Substitution of 5 parts of 3$\beta$-propionyloxyandrost-5-en-17-one and 5 parts of N,N-diethyl-1-propynylamine for the 3$\beta$-acetoxyandrost-5-en-17-one and N,N-dimethyl-1-propynylamine, respectively, called for in Example 1 affords, by the procedure described in the aforesaid example, (Z) - N,N - diethyl-3$\beta$-propionyloxy-pregna-5,17-(20)-diene-20-carboxamide and (E)-N,N-diethyl-3$\beta$-propionyloxypregna-5,17(20)-diene-20-carboxamide. The former is isolated from an eluate comprising 10% ethyl acetate in benzene and the latter from an eluate comprising 15% ethyl acetate in benzene.

EXAMPLE 7

N,N-diethyl-3β-hydroxypregna-5,17(20)-diene-20-carboxamide.

Substitution of 5 parts of (Z)-3β-acetoxy-N,N-diethylpregna-5,17(20)-diene-20-carboxamide for the 3β-acetoxy - N,N - dimethylpregna-5,17(20)-diene-20-carboxamide called for in Example 2 affords, by the procedure there detailed, N,N-diethyl-3β-hydroxypregna-5,17(20)-diene-20-carboxamide. The product, upon recrystallization from a mixture of ether and petroleum ether, melts at 145–148°.

EXAMPLE 8

N,N-diethyl-3-oxopregna-4,17(20)-diene-20-carboxamide.

Substitution of 14 parts of N,N-diethyl-3β-hydroxypregna-5,17(20)-diene-20-carboxamide for the 3β-hydroxy - N,N - dimethylpregna-5,17(20)-diene-20-carboxamide called for in Example 3 affords, by the procedure there detailed, N,N-diethyl-3-oxopregna-4,17(20)-diene-20-carboxamide. Upon recrystallization from a mixture of ether and petroleum ether, the product is obtained as colorless crystals melting at 161–163°.

EXAMPLE 9

21-diethylamino-20-methylpregna-4,17(20)-dien-3-one hydrochloride.

Substitution of 20 parts of N,N-diethyl-3-oxopregna-4,17(20)-diene-20-carboxamide for the N,N-dimethyl-3-oxopregna-4,17(20)-diene-20-carboxamide called for in Example 4 affords, by the procedure there detailed, 21-diethylamino-20-methylpregna - 4,17(20)-dien-3-one hydrochloride. The product, further purified by slurrying in 250 parts of ethyl acetate and thereafter dried in air, is obtained as a colorless material melting at 215–218°.

What is claimed is:
1. A compound of the formula

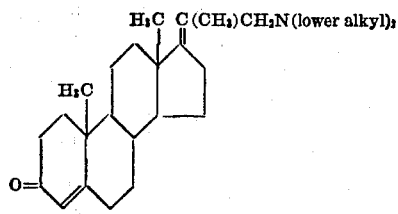

2. A compound according to claim 1 which is 21-diethylamino-20-methylpregna-4,17(20)-dien-3-one.
3. A compound of the formula

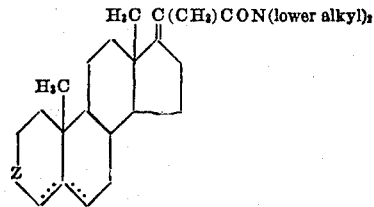

wherein Z represents β-(lower alkanoyloxy)methylene, β-hydroxymethylene or carbonyl, and the dotted line denotes Δ⁴ unsaturation when Z represents carbonyl and Δ⁵ unsaturation otherwise.

4. A compound according to claim 3 having the formula

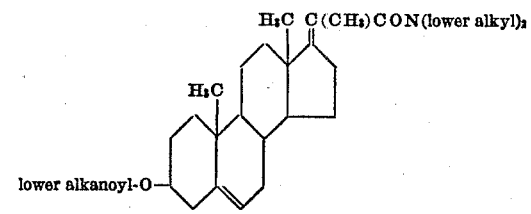

5. A compound according to claim 3 which is 3β-acetoxy-N,N-diethylpregna-5,17(20)-diene-20-carboxamide.
6. A compound according to claim 3 having the formula

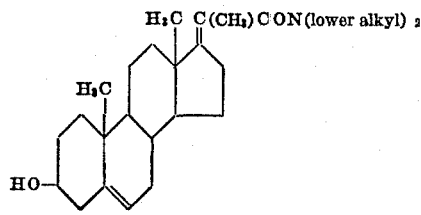

7. A compound according to claim 3 which is N,N-diethyl-3β-hydroxypregna-5,17(20)-diene-20-carboxamide.
8. A compound according to claim 3 having the formula

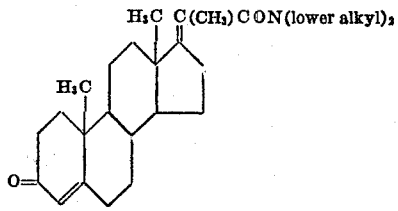

9. A compound according to claim 3 which is N,N-diethyl-3-oxopregna-4,17(20)-diene-20-carboxamide.

References Cited
UNITED STATES PATENTS
3,272,708   9/1966   Bertin et al. _____ 167—65

HENRY A. FRENCH, Primary Examiner

U.S. Cl. X.R.
260—397.3, 999